Figure 1:
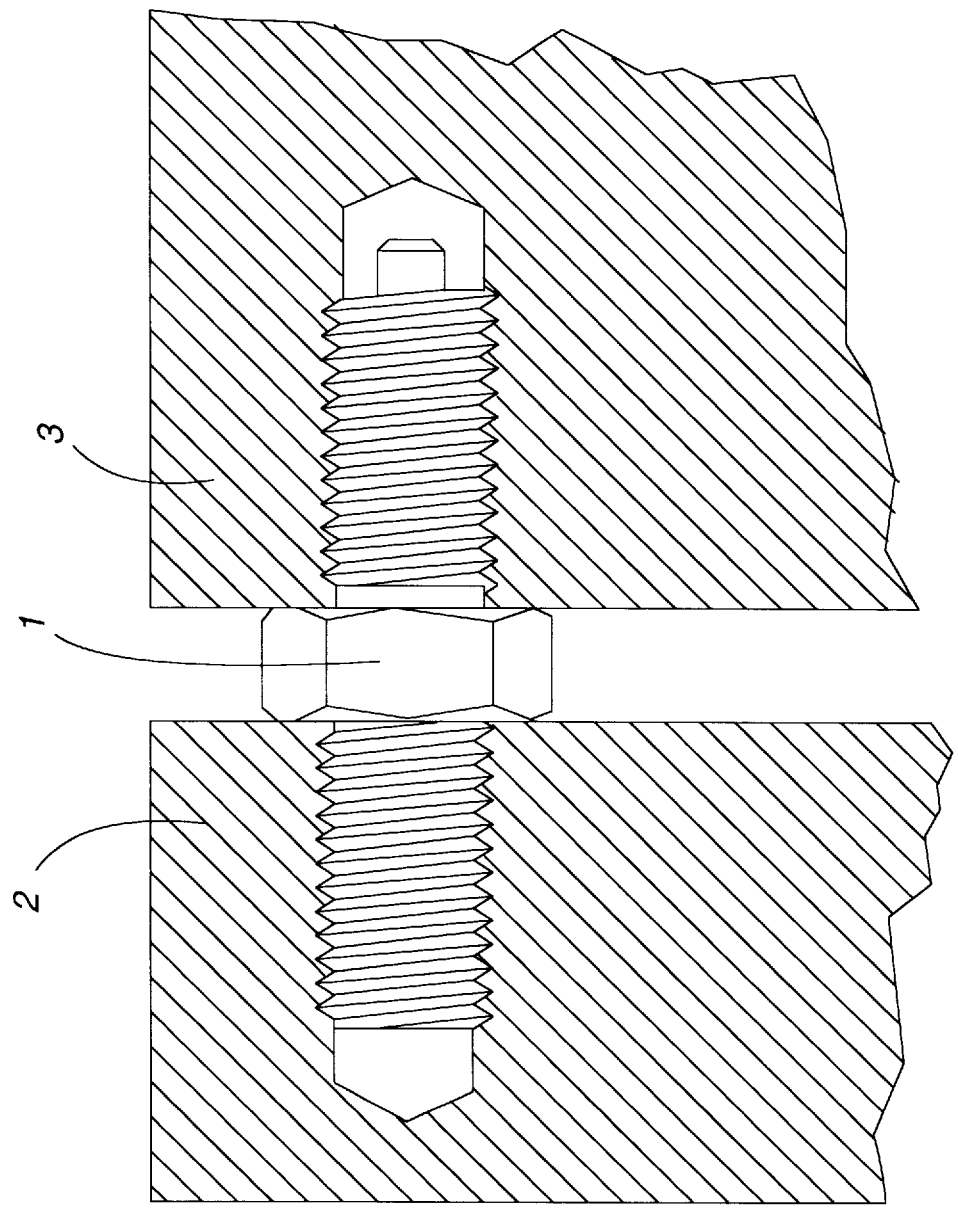

United States Patent

Girbinger

[11] Patent Number: 5,769,583
[45] Date of Patent: Jun. 23, 1998

[54] CONNECTING ELEMENT WITH THREAD ON BOTH SIDES

[76] Inventor: Max Girbinger, Rudolf-Diesel-Str. 10, Gerlinden, Germany

[21] Appl. No.: 693,244

[22] PCT Filed: Feb. 9, 1995

[86] PCT No.: PCT/EP95/00472

§ 371 Date: Sep. 6, 1996

§ 102(e) Date: Sep. 6, 1996

[87] PCT Pub. No.: WO95/22702

PCT Pub. Date: Aug. 24, 1995

[30] Foreign Application Priority Data

Feb. 18, 1994 [DE] Germany ............................ 44 05 240.5

[51] Int. Cl.$^6$ .................................................. F16B 35/00
[52] U.S. Cl. ............................................ 411/389; 411/388
[58] Field of Search .................................... 411/383, 384, 411/388, 389

[56] References Cited

U.S. PATENT DOCUMENTS

| | | | |
|---|---|---|---|
| 1,394,608 | 10/1921 | Davern | 411/384 |
| 1,644,477 | 10/1927 | Klaus | 411/389 |
| 1,864,080 | 6/1932 | Madge | 411/389 |
| 1,897,196 | 2/1933 | Hunt | 411/389 |
| 1,988,813 | 1/1935 | Sequin | 411/383 |
| 3,455,198 | 7/1969 | Barrett | 411/389 |
| 3,659,490 | 5/1972 | Buck . | |
| 4,729,707 | 3/1988 | Takahashi | 411/389 |
| 4,784,554 | 11/1988 | Break . | |

FOREIGN PATENT DOCUMENTS

| | | | |
|---|---|---|---|
| 0191245 | 8/1986 | European Pat. Off. | F16B 35/00 |
| 520766 | 3/1931 | German Dem. Rep. | 411/389 |
| 1962465 | 7/1970 | Germany | E06B 1/60 |
| 2459529 | 9/1975 | Germany | F16B 35/04 |
| 679324 | 1/1992 | Switzerland | F16B 37/04 |
| 665392 | 1/1952 | United Kingdom . | |
| 1185149 | 3/1970 | United Kingdom . | |

OTHER PUBLICATIONS

N.N.: Unsichtbare Steckverbindungsschraube. In: Deutsche Bauzeitung, dbt Mar. 1964, 16, S.229; Abs.4.

*Primary Examiner*—Rodney M. Lindsey
*Assistant Examiner*—Gary Estremsky
*Attorney, Agent, or Firm*—Sheridan Ross PC

[57] ABSTRACT

Both threads of a connecting element—with thread on both sides for a detachable connection of two component parts or objects—consisting of several, preferably three joinable parts, i.e. base screw, secondary screw, and clamping nut, are right-handed.

18 Claims, 6 Drawing Sheets

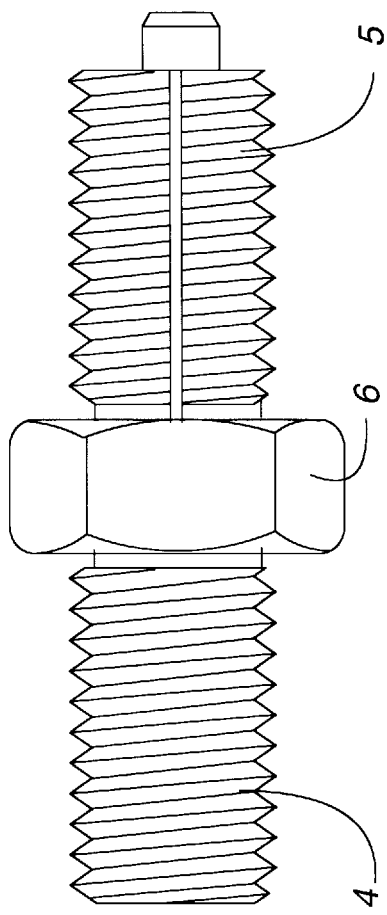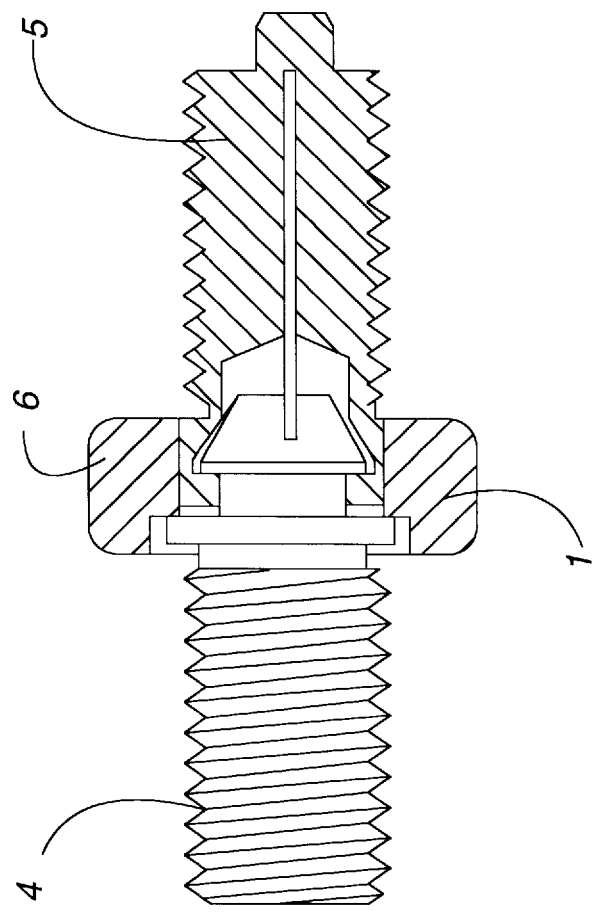
Fig. 2A
Fig. 2B

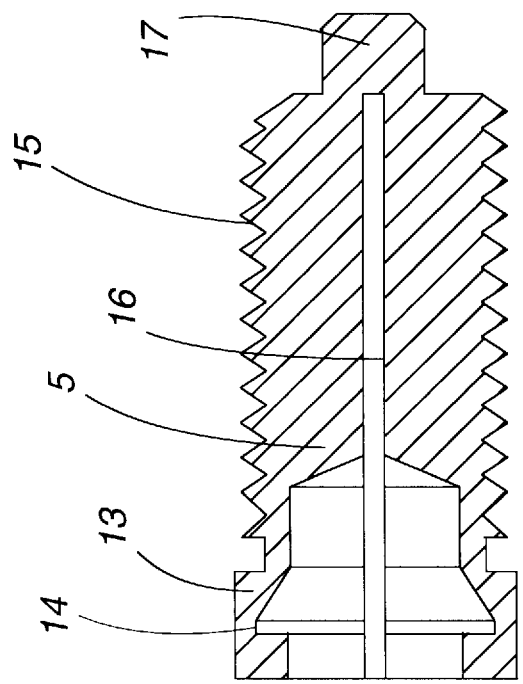
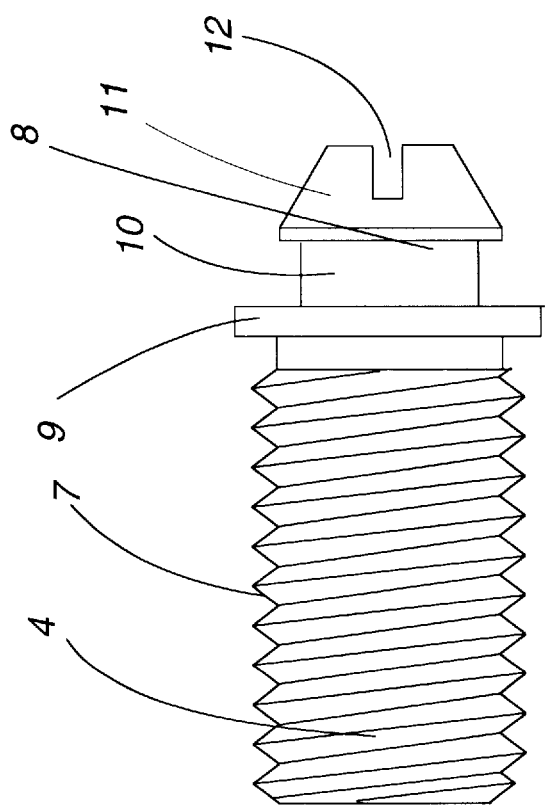
Fig. 3A
Fig. 3B

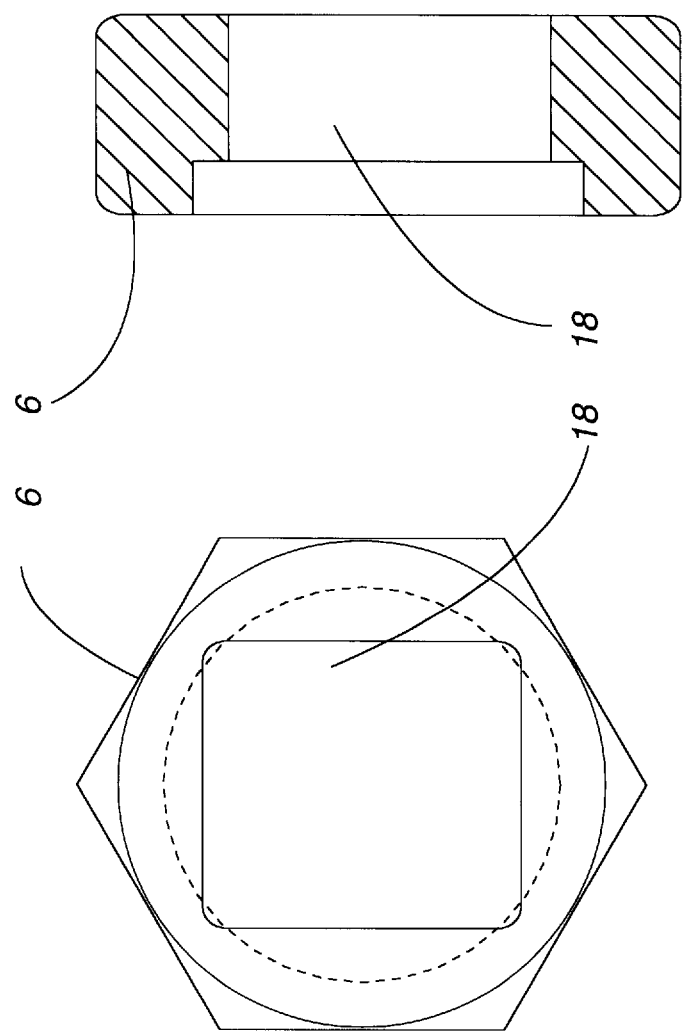

CONNECTING ELEMENT WITH THREAD ON BOTH SIDES

The present invention relates to a connecting element with thread on both sides for a detachable connection of two component parts or objects according to the preamble of claim 1.

Connecting elements have been known which in their center show a screw nut and at the two opposite ends each comprise a thread. These connecting elements have been constructed from one pierce for example by forging. The special characteristic of these connecting elements is that one thread is right-handed, however the other thread is left-handed by which according to the turn direction of the nut two component parts or objects connected by thread bottom hole borings and the two threads of the connecting element either withdraw from each other or approach each other. A very particular characteristic of these connecting elements is that by the latter a defined distance between the two component parts or objects can be adjusted.

Furthermore it has been known that these connecting elements consist of one piece because of which a possible alignment of the two component parts or objects cannot be compensated.

Moreover, when assembling these known connecting elements for a detachable connection of the two component parts or objects there will arise further problems. To screw the connecting element into both component parts or objects at the same time these two component parts or objects must be arranged in an initial distance which is at least as long as the length of the connecting element. This is impossible at hardly accessible places or considerably restricts the serviceability of such a connecting element. Furthermore, when assembling the two component parts or objects they must additionally be aligned with each other in an exact manner because of the rigid one-piece construction of the connecting element.

Therefore it is the object of the present invention to avoid the above-mentioned disadvantages of a detachable connection of two component parts or objects and particularly to create a connecting element which can be used at hardly accessible places and is constructed in a simple and robust manner and easily to be handled.

This object is solved by means of a connecting element consisting of several joinable parts the two thread parts of which are right- as well as left-handed according to the characteristics described in the characterizing clause of claim 1 of the corresponding patent claims. The present invention allows a considerable reduction of the assembly time and thereby of the expenses of assembling. Furthermore, when renouncing the passage borings also these elements can be connected to each other which otherwise are not accessible from any side or are only hardly accessible and/or, because of restricted space conditions, are accessible in a complicated manner only.

In the following there will be described a preferred embodiment of the invented connecting element with the help of the enclosed drawings.

In these drawing the figures show the following:

FIG. 1: The cross-section of the connecting element in assembly condition with the two component parts or objects, FIG. 2: A lateral view and a cross-section of the joined connecting element, FIG. 3: The construction of the base screw in side view and in cross-section the construction of the secondary screw, FIG. 4: Plan view and cross-section of the clamping nut, FIG. 5: As lateral view different dimensions of the base thread of the base screw, FIG. 6: Plan view and lateral view of various designs of the clamping nut.

The connecting element (1) in FIG. 1 serves for detachable connection of two objects or component parts (2, 3), particularly for connecting two objects (2, 3) at places inaccessible or only hardly accessible by one or both object sides, e.g., walls erected to separate rooms.

FIG. 2 shows the inner and exterior composition of the preferred embodiment of the connecting element (1) consisting of the three components base screw (4), secondary screw (5), and clamping nut (6) in assembled condition.

The base screw (4) shown in FIG. 3 comprises a right-handed base thread (7) and a joining cap screw (8) the latter (8) consisting of a stop (9), a distance section (10), and a locking section (11) with truncated cone in its preferred embodiment provided with a recess (12) at its front side for the reception of a screw turning device not shown here, e.g. a screwdriver. This recess (12) is in the preferred embodiment a slot for the reception of the blade of a slot screwdriver (not shown here), but can also be constructed as hexagon socket or something similar according to the case of application.

Figure 5C:
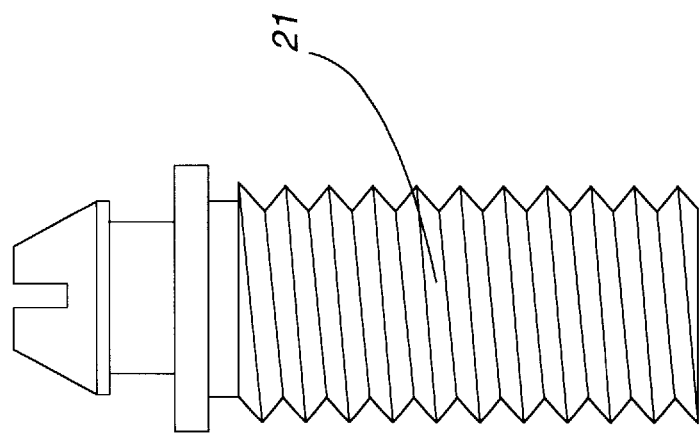
Figure 5B:
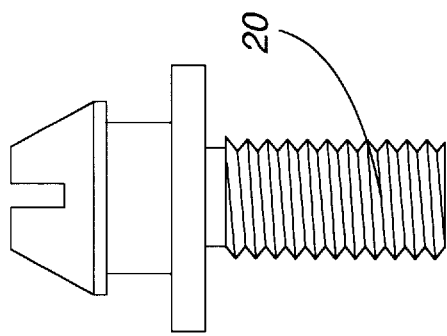
Figure 5A:
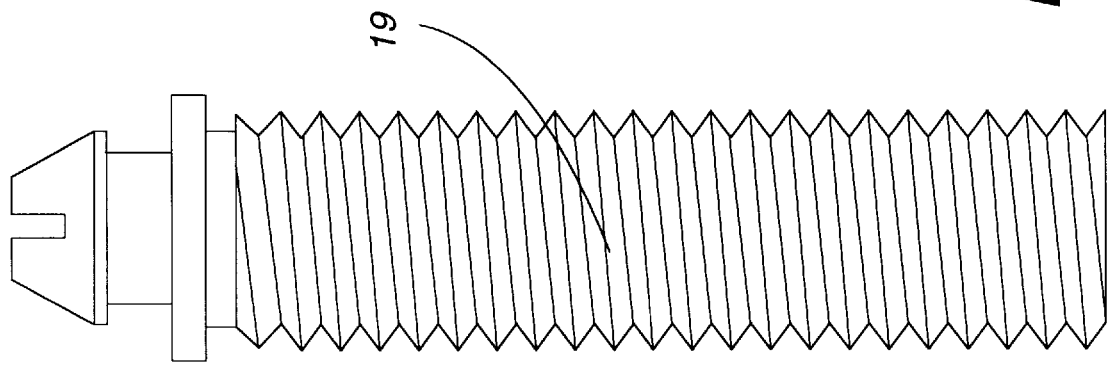

Further embodiments of the base screw (7) are to be seen in FIG. 5. While the joining cap screw (8) has always been designed in the same way the base thread (7) can be altered according to the case of application. FIG. 5 shows different sizes and dimensions (19, 20, 21) of a right-handed metric thread. These special embodiment of the base thread (7) are only examples. For an expert it is obvious that the base thread (7) can have every known thread design, in particular the embodiment of a base thread (7) with a dowel and a wood screw is possible, too.

Beside the base screw (4) these is also shown in FIG. 3 the inner and exterior structure of the secondary screw (5) shown in longitudinal section which mainly consists of a reception cap (13) and a right-handed secondary thread (15). The secondary screw (5) is provided with one or more slots (16) preferably extending from the reception cap (13) to a pin (17) the secondary screw (5) being preferably slotted twice in such a way that the plan view shows a cross shape. This makes an expansion possible so that the secondary screw (5) can be moved over the locking section (11) of the base screw (4). The pin (17) is located at the end of the secondary screw (5) opposite to the reception cap (13), has a cylindrical shape and a shorter diameter than the second thread (15). In the interior the secondary screw (5) behind a projection (14) is designed in such a way that the inner contour of the reception cap (13) corresponds to the exterior contour of the locking section (11) of the base screw (4).

The clamping nut (5) of FIG. 4 externally shows in its preferred embodiment the contour of a commercial hexagon nut. The inner contour (18) of the clamping nut (6) is designed in such a way that it corresponds to the exterior contour of the reception cap (13) of the secondary screw (5) to permit reception, wherein in a preferred embodiment the exterior contour of the reception cap (13) and the inner contour (18) of the clamping nut (6) are square. Additionally the inner contour (18) of the clamping nut (6) has an additional recess for the reception of the stop (9) of the base screw (4) in assembled condition.

Figure 6A:
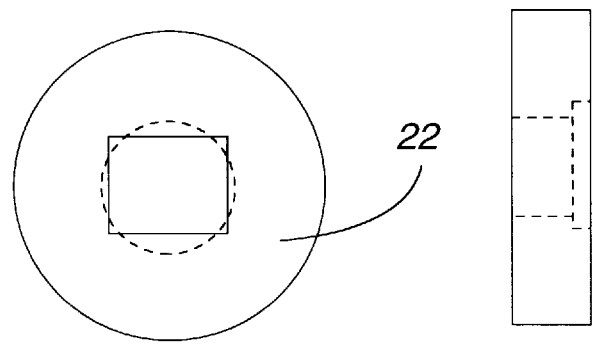
Figure 6B:
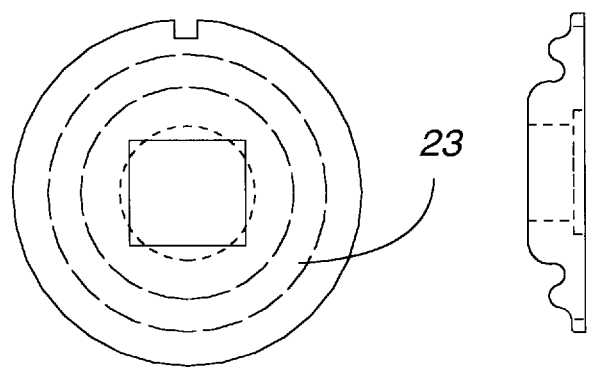
Figure 6C:
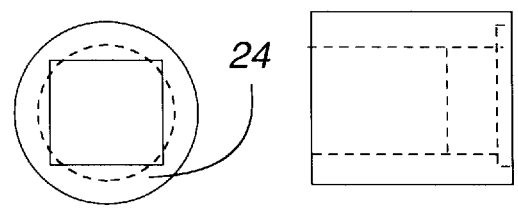

While this inner contour (18) of the clamping nut (6) is always the same in the different designs of the rosette (6) shown in FIG. 7 the exterior contour of the clamping nut (5) may have various shapes and dimensions. The designs of a round rosette (22), an ornament rosette (23), and a distance rosette (24) in FIG. 6 are shown as examples only.

The assemblage of two component parts or objects (2, 3) by means of the invented connecting element (1) with thread on both sides is carried out step by step in the following way.

Before the assemblage the two objects (2, 33) are provided with right-handed thread bottom holes at the suitable places. Then the base screw (4) is screwed up to the stop (9) into one of the two objects 2, 3). The stop (9) must sit on the thread borehole with its total bearing surface dimensioned adequately to be in a position to fulfill the task of a commercial screw head.

After than the secondary screw (5) is put upon the base screw (4) in such a way that the locking section (11) of the base screw (4) locks behind the projections (14j in the reception cap (13) of the secondary screw (5). Therein the e.g. secondary screw is expanded; this means that the four segments of the secondary screw connected for example by the pin (17) and formed by the slot or slots are spread apart. After the locking of the locking section (11) behind the projections (14) the expanded segments of the secondary screw (5) return. The function of the pin (17) is for reduction of the cross-section at the end of the second screw (5) in order to facilitate the expansion of the segments or to make it possible even depending on the material of the secondary screw (5).

After there has been created such a positive connection of the secondary screw (5) and the base screw (4), the clamping nut (6) is put onto the secondary screw (5) in such a way that the reception cap (13) and the inner contour (18) of the clamping nut (6) also form a positive connection. Thereby the clamping nut (6) is aligned in such a way that it also covers the stop (9) of the base screw (4) with its inner contour (18). The connecting element according to the invention is now connected as shown in FIG. 2 the right-handed base screw (4) being located as described above in a right-handed thread bottom hole in a first object (2).

By turning the clamping nut (6) one thereupon screws the right-handed secondary screw (5) into a likewise right-handed thread bottom hole of a second object (3) and namely as long that between the locking section (11) of the base screw (4) and the inner contour in the reception cap (13) of the secondary screw (5) there has been obtained a frictional connection.

Also smaller alignment defects of the thread bottom hole borings in the two component parts of objects (2, 3) can be compensated by the adequate design of the joining cap screw (8) and the inner contour of the reception cap (13). Additionally the space between the two objects (2, 3) needed for the assembly is reduced from the total length of a commercial connecting element to a little more than half of the connecting element (1) according to the invention.

The disassembly of the two component parts or objects (2, 3) is carried out in the reverse manner to the above-described sequence. Therein the disassembling of base screw (4) and secondary screw (5) is for example executed after an external expansion of the individual segments. The secondary screw (5) may however also be cut off so that the separation of base screw (4) and secondary screw (5) takes place after the fracture of one or several segments of the secondary screw (5).

What is claimed:

1. A connecting element having opposing first and second threaded segments for the detachable connection of two objects, the threads being of the same handed direction, comprising:

a first threaded segment having a plurality of threads and a joining cap screw located at opposing ends of the first threaded segment, the joining cap screw comprising a locking section;

a second threaded segment having a plurality of threads and a reception cap located at opposing ends of the second threaded segment, the reception cap being turnably received in the locking section; and a clamping nut having a central bore extending therethrough including means for receiving a portion of the second threaded segment therein such that the clamping nut can be slid axially onto the portion of the second threaded segment whereby, when the clamping nut is slid axially onto the portion of the second threaded segment, the clamping nut and the second threaded segment are lockably engaged and rotation of the clamping nut causes rotation of the second threaded segment.

2. A connecting element according to claim 1 characterized in that the second threaded segment comprises adjacent projections separated by a longitudinal slot extending along a length of the second threaded segment, the adjacent projections being movable relative to one another to permit said reception cap to receive said locking section.

3. A connecting element according to claim 2 characterized in that the first threaded segment comprises a joining cap screw for connection with the second threaded segment.

4. A connecting element according to claim 3 characterized in that the joining cap screw comprises a stop and a distance section, and the locking section is provided with a recess for the reception of a screw turning device.

5. A connecting element according to claim 4 characterized in that the locking section is formed as a truncated cone and is located at a thread-free end of the first threaded segment.

6. A connecting element according to claim 2 characterized in that the reception cap has an inclined surface to facilitate reception of the reception cap in the locking section.

7. A connecting element according to claim 6 characterized in that the volume enclosed by the reception cap is expandable by means of a plurality of projections defined by one or more cruciately arranged slots extending a length of the second threaded segment.

8. A connecting element according to claim 6 characterized in that an inner contour of the reception cap is stepped to engage an exterior contour of the locking section located behind a projection of the first threaded segment.

9. A connecting element according to claim 1 characterized in that a pin is located at an end of the second threaded segment, the pin having a cross-sectional area normal to a longitudinal axis of the second threaded segment that is less than a cross-sectional area of an adjacent portion of the second threaded segment normal to the longitudinal axis.

10. A connecting element according to claim 4 characterized in that an inner contour of the clamping nut is shaped in such a way that, after assembling the first and second threaded segments and clamping nut, there is a positive connection of the clamping nut and an exterior contour of the reception cap of the second threaded segment, and the stop of the first threaded segment is covered by the clamping nut.

11. A connecting element according to claim 10 characterized in that the clamping nut is designed as a rosette.

12. The connection element of claim 1, characterized in that, when the clamping nut lockably engages the portion of the second threaded segment, rotation of the clamping nut causes rotation of the second threaded segment while the first threaded segment is free of rotation.

13. The connection element of claim 1, characterized in that, when the first and second threaded segments are turnably engaged, turning of the second threaded segment relative to the first threaded segment is free of axial displacement of the second threaded segment relative to the first threaded segment.

14. A connecting element having opposing first and second threaded segments for the detachable connection of two objects, comprising:

a first threaded segment having a plurality of threads located at an end thereof;

a second threaded segment having a plurality of threads located at an end thereof, the plurality of threads of the first threaded segment having the same handed direction as the plurality of threads of the second threaded segment;

connection means for rotatably engaging the first threaded segment to the second threaded segment, whereby the first and second threaded segments have freedom of rotation relative to one another, such that rotation of the second threaded segment relative to the first threaded segment is free of axial displacement of the second threaded segment relative to the first threaded segment, the connection means comprising a plurality of projections extending from one of the first and second threaded segments, the plurality of projections being separated by at least one longitudinal slot extending a substantial length of the one of the first and second threaded segments and being displaceable relative to one another, and a second projection on the other of the first and second threaded segments, the second projection being received between the plurality of projections; and a clamping nut for tightening at least one of the first and second threaded segments in a threaded hole, the clamping nut having a central bore extending therethrough and including means for receiving at least a portion of the at least one of the first and second threaded segments therein such that the clamping nut can be slid axially onto the at least one of the first and second threaded segments and, when the clamping nut is slid axially onto the portion of the at least one of the first and second threaded segments, the clamping nut and the at least one of the first and second threaded segments are lockably engaged.

15. The connection element of claim 14, wherein the plurality of projections and second projection define interlocking male and female portions of the first and second threaded segments.

16. The connection element of claim 14, wherein the first threaded segment comprises a stop that abuts ends of the plurality of projections.

17. The connection element of claim 14, wherein the connection means comprises an inclined surface on at least one of the first and second threaded segments at an end thereof to facilitate rotatable engagement of the first and second threaded segments.

18. A method for connecting two objects to one another, comprising:

screwing a first threaded segment into a first threaded hole;

thereafter rotatably engaging an end of a second threaded segment with a free end of the first threaded segment such that rotation of the second threaded segment relative to the first threaded segment is free of axial displacement of the second threaded segment relative to the first threaded segment;

axially sliding, over the engaged ends of the first and second threaded segments, a clamping nut for tightening at least one of the first and second threaded segments, whereby rotation of the clamping nut causes rotation of the at least one of the first and second threaded segments; and after the rotatably engaging step, screwing the second threaded segment into a second threaded hole having a common longitudinal axis with the first threaded hole.

\* \* \* \* \*